United States Patent Office 2,762,618
Patented Sept. 11, 1956

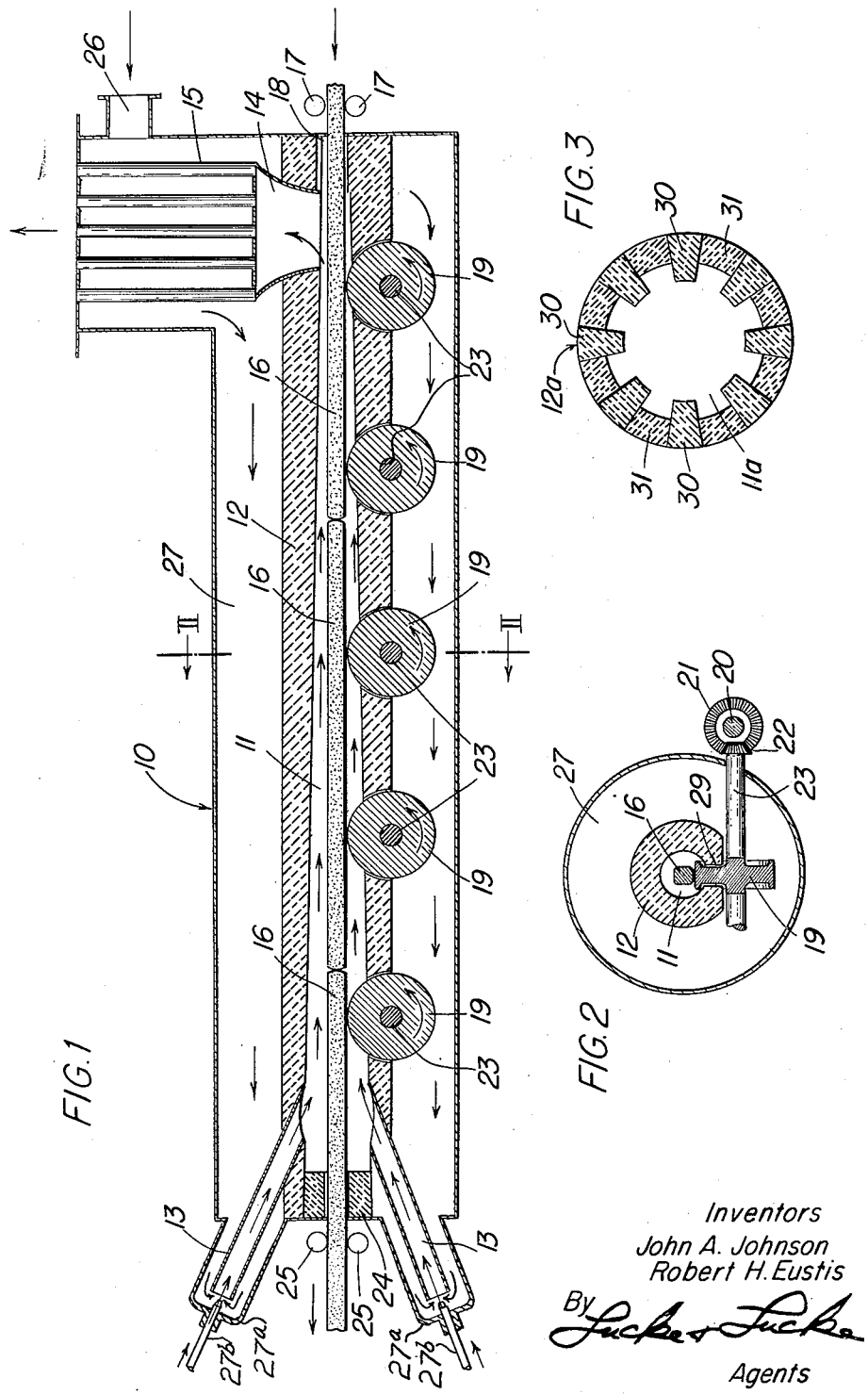

2,762,618
BILLET HEATING FURNACE

John A. Johnson, Stratford, Conn., and Robert H. Eustis, Newtonville, Mass., assignors to Thermal Research and Engineering Corporation, Conshohocken, Pa., a corporation of Delaware Application June 18, 1951, Serial No. 232,174

4 Claims. (Cl. 263—6)

This invention relates to a furnace, and more particularly a furnace for heating to high temperature a substance which moves therethrough. The invention is especially useful in its application to the heating of steel billets, in connection with which it will be particularly described. However, the invention is not restricted to such use.

In high temperature furnaces for heating substances passed therethrough, it is usual to place the fuel in the heating chamber itself and to burn it there, or to inject into the heating chamber the burning combustion gases and to complete the combustion there. Slow movement of the combustion gases through the furnace is usual. In such furnaces heating is effected largely through the radiant heat of the flame and through radiation from the furnace walls. In furnaces of the type in which billets are reheated, radiant heat transfer is principally employed at the high temperature end, and convection heat transfer, together with radiation, at low rates, is employed at the opposite end of the furnace. The relatively low over-all heat transfer rate in such furnaces requires that a furnace of large size be constructed at high initial cost; and the efficiency of such furnaces is low because of heat losses, even when a recuperator is used to recover energy from the discharged gases. Furthermore, excessive scaling losses result from the use of such furnaces for billet reheating, since a relatively long heating time is required and since the atmospheres in such furnaces are generally slightly oxidizing. Furnaces which employ high rate radiant heat transfer throughout permit substantial reduction in space requirements, but involve high operating costs, because of excessive burner maintenance and high stack losses.

We have now found it possible to construct a high temperature furnace which is simple and relatively inexpensive, which is exceedingly efficient in operation, which may be easily controlled, and wherein heat losses are negligible.

According to the invention the high temperature furnace is constructed with an elongated heating chamber through which the substance to be heated is moved longitudinally. A fluid fuel-air mixture is burned, under control, externally of the heating chamber, and the highly heated products of substantially complete combustion are injected at high velocity into the heating chamber at its end toward which the substance to be heated moves. Thence the products of combustion move at high velocity through the heating chamber in a direction counter to that of the movement of the substance to be heated. There is relatively little gas radiation within the furnace, the heat transfer taking place largely by convection and wall radiation.

The invention also contemplates passage of the products of combustion through the heating chamber at substantially constant linear velocity and with increasing mass velocity as the combustion products give up their heat. Furthermore, both the heat of the gases leaving the furnace and the heat of the furnace walls may be employed to pre-heat the air which enters the fluid fuel-air mixture which is burned.

The invention is shown by way of illustration in its application to a billet-heating furnace in the accompanying drawings, in which—

Fig. 1 is a longitudinal vertical mid-section through a billet-heating furnace constructed and arranged according to the invention, the furnace being shown in semi-diagrammatic form;

Fig. 2 is a cross-section taken on the line II of Fig. 1, and

Fig. 3 is a similar cross-section, showing in semi-diagrammatic form and on an enlarged scale, a variant form of furnace wall.

In the embodiment of the invention which is illustrated in the drawings there is shown a high temperature furnace 10 comprising an elongated chamber 11 defined by a substantially cylindrical ceramic wall 12. Means is provided for injecting the heated products of substantially complete combustion at high velocity into one end of the chamber 11; and means is also provided for withdrawing the products of combustion from the opposite end of the chamber 11.

It is contemplated by the invention that a plurality of specially designed burners be connected into the elongated chamber 11 to inject the products of substantially complete combustion therein. Two such burners 13, 13 are shown in diagrammatic form in Fig. 1. Although any type of burner may be employed which will inject into the chamber 11, at high velocity, the highly heated products of substantially complete combustion, it has been found advantageous to employ for this purpose burners such as these disclosed in the copending patent applications of Witold Brozozowski, U. S. Serial No. 108,316, filed August 3, 1949 for Fluid Fuel Air Burner, now Patent No. 2,632,300; U. S. Serial No. 117,371, filed September 23, 1949 for Burner, now abandoned; and U. S. Serial No. 176,670, filed July 29, 1950 for Fluid Fuel Burner, now Patent No. 2,697,910. It has been found that such burners, wherein combustion is substantially completed under control within the burner, give satisfactory results when used with the furnaces of the present invention.

The means for withdrawing the products of combustion from the other end of the elongated chamber 11 is preferably a flue 14 for passage of the products of combustion out of the chamber 11. In the embodiment here shown there is connected in the flue 14 a recuperator 15, the function of which will be later described. The capacity of the flue and recuperator must be sufficient to insure high velocity of the products of combustion passing through the elongated chamber.

Means is also provided for passing substantially centrally through the elongated chamber 11, in a direction counter to the flow of the products of combustion therethrough, a substance to be heated in the chamber. In the embodiment illustrated, billets 16 are passed through the chamber 11 in a manner which will now be described. A pair of injector rolls 17, 17 grip the billet 16 and initiate its entrance into the furnace through a constricted end 18 thereof adjacent the flue 14. The billets 16 are moved substantially centrally through the chamber 11 upon a series of transversely journaled support wheels 19 which project partially into the chamber 11.

The support wheels 19 may be driven in any known or convenient manner in order to pass the billets through the chamber 11 from the constricted end 18 toward and past the burners 13. One means for driving the wheels 19 is illustrated in Fig. 2, and comprises a shaft 20 extending longitudinally of the furnace and having bevel gears 21 mounted thereon to engage bevel gears 22 upon the outer ends of axles 23 of the wheels 19. Thus, a billet 16 moved into the furnace by the injector rolls 17, 17 is carried through the elongated chamber 11 by frictional contact with the support wheels 19 upon which it is carried.

A ceramic skid 24 surrounds the end of the elongated chamber 11 which is opposite to the constricted end 18 of the chamber just beyond the burners 13; and a pair of extractor rolls 25, 25 act upon opposite faces of the billet 16 as it passes over the ceramic skid 24 to draw the billet out of the furnace.

Clearly, the ceramic wall 12 and the elongated chamber 11 may be widened to accommodate more than one line of billets passing through the furnace, and the conformation or the number of support wheels 19 may be changed without invention. Clearly also the number and arrangement of the burners 13 may be varied as desired or necessary. Furthermore, in certain applications of the invention, it has been found desirable to position additional groups of burners of intervals along the length of the chamber 11.

It is desirable to provide maximum combustion temperature in the burner and maximum heat release by the burner in injecting the products of combustion into the elongated chamber 11. Accordingly, the combustion air supplied to the burners is preheated. To this end the combustion air enters the furnace through a tube 26, whence it passes through the recuperator 15, where it is highly heated by the products of combustion passing through the flue 14. From the recuperator the preheated air passes through a conduit 27 which surrounds the elongated chamber 11 and its ceramic wall 12, flowing externally of the ceramic wall 12 in a direction counter to that of the heated products of combustion until it reaches the end portion of the conduit 27 surrounding the burners 13. The air for combustion then enters a casing 27a surrounding the burner 13 and is directed into the burner wherein it is mixed with fuel ejected from a nozzle 27b and is burned. The arrangement of the conduit 27 permits the air for the burners to receive additional heat from the ceramic wall 12, and at the same time minimizes the heat lost by the ceramic wall to the ambient atmosphere.

Not only does the combustion air receive heat from the recuperator 15 and from the ceramic wall 12, but it also receives heat from the means whereby the billets 16 or the like are carried through the furnace, this means constituting a regenerative conveyor. In the embodiment illustrated, the support wheels 19, a major portion of each of which rotates within the conduit 27, transfer heat from the furnace into the air which is fed to the burners 13. As the support wheels 19 rotate, they carry heat from the elongated chamber 11 into the surrounding conduit 27, thereby giving additional heat to the combustion air flowing through the conduit and being cooled thereby. The axles 23 of the support wheels 19 are also cooled by the combustion air; and the journals in which these axles rotate (not shown) are positioned outside of the conduit 27 and will operate satisfactorily without special cooling. A single-step labyrinth 29 in the ceramic wall 12 serves to decrease the leakage between the chamber 11 and the conduit as the wheels 19 rotate into and out of the chamber.

The pre-heated combustion air enters the burners and is proportioned with respect to the fluid fuel supply to produce an approximately stoichiometric fuel-air mixture. Combustion is completed within the burners and only the products of substantially complete combustion enter the elongated chamber 11. Scaling is therefore practically eliminated. Where a rich mixture is used in the burners to assure complete lack of scaling, the highly preheated air, nevertheless, maintains a rate of combustion and supplied additional heat to the products of combustion which, together, insure the high temperature required in the furnace.

The internal transverse cross-sectional area of the elongated chamber 11 is preferably diminished from the point of injection of the products of combustion to its opposite end. Such reduction in cross-sectional area is illustrated in Fig. 1 of the drawings, and is gradual and uniform. By this means the linear velocity of gas flow is maintained, the mass velocity is increased, and the heat transfer coefficient from the gas to the billets is increased as the gas is cooled.

From the foregoing, operation of the furnace will be evident. The billets are moved into the furnace by the injector rolls 17 at the right, and are moved out of the furnace by the extractor rolls 25 at the left, as illustrated in Fig. 1. The heated products of substantially complete combustion are injected into the furnace at high velocity by the burners 13 and pass at high velocity through the elongated chamber 11 in a direction counter to that of the billets. Leaving the furnace through the flue 14 the products of combustion preheat the combustion air in the recuperator in the manner which has already been described. The rapid flow of the products of combustion assures a high rate of heat exchange with the billets because of the increased convection heat transfer coefficient. Thus the convection heat transfer is several times that which is possible in known types of furnace employed for this purpose. Furthermore, the high temperature gas in contact with the wall 12 of the elongated chamber 11 heats the wall and produces considerable radiant heat transfer, particularly at the end of the chamber into which the burners 13 are connected. At the same time the surrounding conduit 27 permits operation of the furnace at temperatures high enough to make radiant heat transfer an important factor while minimizing heat loss to the ambient atmosphere.

In order that the temperature of the furnace wall may be more nearly equal to the temperature of the gas passing through the furnace, the inner face of the furnace wall may be serrated as illustrated in Fig. 3. In this embodiment the furnace wall 12a which surrounds the elongated chamber 11a is formed of a plurality of ceramic blocks. Alternate blocks 30 are elongated to extend inwardly beyond adjacent blocks 31. This structure results in higher wall temperature and causes an increase in the radiant component of the total heat transfer. The construction illustrated in Fig. 3 is especially effective near the low temperature end of the furnace.

As a result, the present invention provides a simple, efficient furnace, of reduced size and cost with respect to its capacity, and makes possible an economy of operation and maintenance which has heretofore been impossible.

The form of the invention here described and illustrated is presented merely as an example of how the invention may be applied. Other forms and embodiments of the invention, coming within the proper scope of the appended claims will, of course, suggest themselves to those skilled in the heating art.

We claim:

1. A high temperature furnace comprising: an elongated chamber; a fluid fuel-air burner for injecting at high velocity into said chamber, near one end thereof, the heated products of substantially complete combustion; a flue for outward passage of the products of combustion connected to the opposite end of said chamber; and a recuperator connected in said flue for preheating the air supplied to said burner; in combination with a conduit for carrying the preheated air from said recuperator to said burner, said conduit surrounding said chamber to receive heat therefrom; and means for conveying substantially centrally through said chamber, in a direction counter to the flow of the products of combustion therethrough, a substance to be heated therein.

2. A high temperature furnace comprising: an elongated chamber; a fluid fuel-air burner for injecting at high velocity into said chamber, near one end thereof, the heated products of substantially complete combustion; a flue for outward passage of the products of combustion connected to the opposite end of said chamber; and a recuperator connected in said flue for preheating the air supplied to said burner; in combination with a conduit for carrying the preheated air from said recuperator to said burner, said conduit surrounding said chamber to receive heat therefrom; and a conveyor for moving substantially centrally through said chamber, in a direction counter to the flow of the products of combustion therethrough, a substance to be heated therein, said conveyor comprising a plurality of transversely journaled wheels spaced at intervals longitudinally of said chamber, each of said wheels projecting partially into said chamber and partially into said conduit and serving to transmit heat from within said chamber to the air in said conduit; the internal transverse cross-section of said chamber diminishing progressively from the point of injection of the products of combustion therein to the opposite end thereof, to maintain the linear velocity of gas flow, to increase mass velocity, and to increase the heat transfer coefficient as the gas is cooled.

3. A high temperative furnace comprising: an elongated chamber having an internally serrated refractory wall to increase the gas-wall contact area and thereby to provide higher furnace wall temperature; a fluid fuel-air burner for injecting at high velocity into said chamber, near one end thereof, the heated products of substantially complete combustion; a flue for outward passage of the products of combustion connected to the opposite end of said chamber; and a recuperator connected in said flue for preheating the air supplied to said burner; in combination with a conduit for carrying the preheated air from said recuperator to said burner, said conduit surrounding said chamber to receive heat therefrom; and a conveyor for moving substantially centrally through said chamber, in a direction counter to the flow of the products of combustion therethrough, a substance to be heated therein, said conveyor comprising a plurality of transversely journaled wheels spaced at intervals longitudinally of said chamber, each of said wheels projecting partially into said conduit and serving to transmit heat from within said chamber to the air in said conduit; the internal transverse cross-section of said chamber diminishing progressively from the point of injection of the products of combustion therein to the opposite end thereof, to maintain the linear velocity of gas flow to increase mass velocity, and to increase the heat transfer coefficient as the gas is cooled, substantially as described.

4. A high temperature billet heating furnace comprising: an elongated chamber having a minimum internal cross section greater than the transverse cross section of the largest billet to be heated therein; a fluid fuel-air burner for injecting at high velocity into said chamber, near one end thereof, the heated products of substantially complete combustion; a flue for outward passage of the products of combustion connected to the opposite end of said chamber; and a recuperator connected in said flue for preheating the air supplied to said burner; in combination with a conduit for carrying the preheated air from said recuperator to said burner, said conduit surrounding said chamber for receiving heat therefrom; and a conveyor for moving billets endwise substantially centrally through said chamber in a direction counter to the flow of the products of combustion therethrough, said conveyor comprising a plurality of transversely journaled billet-supporting wheels spaced at intervals longitudinally of said chamber, each of said wheels projecting partially into said chamber and partially into said conduit and serving to transmit heat from within said chamber to the air in said conduit; the internal transverse cross section of said chamber diminishing progressively from the point of injection of the products of combustion therein to the opposite end thereof, to maintain the linear velocity of gas flow, to increase mass velocity, and to increase the heat transfer coefficient to the billets as the gas is cooled.

References Cited in the file of this patent

UNITED STATES PATENTS

| | | |
|---|---|---|
| 632,836 | Douglass | Sept. 12, 1899 |
| 1,362,232 | Cooper | Dec. 14, 1920 |
| 1,546,703 | Bailey et al. | July 21, 1925 |
| 1,658,199 | Hott | Feb. 7, 1928 |
| 1,888,720 | George | Nov. 22, 1932 |
| 1,914,717 | Heuer | June 20, 1933 |
| 2,056,904 | Morton et al. | Oct. 6, 1936 |
| 2,199,138 | Moore | Apr. 30, 1940 |
| 2,544,091 | Jordan | Mar. 6, 1951 |
| 2,582,462 | Schrumn | Jan. 15, 1952 |
| 2,622,863 | Dauch | Dec. 23, 1952 |

FOREIGN PATENTS

| | | |
|---|---|---|
| 110,937 | Great Britain | Nov. 7, 1917 |